United States Patent [19]
Komine et al.

[11] Patent Number: 5,268,897
[45] Date of Patent: Dec. 7, 1993

[54] ROUTE SWITCHING SYSTEM IN COMMUNICATIONS NETWORK

[75] Inventors: Hiroaki Komine; Takafumi Chujo; Tetsuo Soejima; Keiji Miyazaki; Takao Ogura, all of Kawasaki, Japan

[73] Assignee: Fujitsu Limited, Kawasaki, Japan

[21] Appl. No.: 787,114

[22] Filed: Nov. 4, 1991

[30] Foreign Application Priority Data

Nov. 9, 1990 [JP] Japan .................. 2-302557

[51] Int. Cl.⁵ .............................................. H04L 1/22
[52] U.S. Cl. ......................................... 370/60; 375/38; 455/8
[58] Field of Search ............... 455/8, 52.1, 59; 371/8.2, 68.2; 340/825.01; 375/3, 38, 40; 370/16, 60

[56] References Cited

U.S. PATENT DOCUMENTS

| | | | |
|---|---|---|---|
| 2,733,296 | 1/1956 | Maggio | 455/8 |
| 3,409,875 | 11/1968 | De Jager et al. | 375/40 |
| 3,500,319 | 3/1970 | Van Duuren et al. | 375/40 |
| 4,490,830 | 12/1984 | Kai et al. | 375/40 |

FOREIGN PATENT DOCUMENTS

1-286645(A) 11/1989 Japan .
2-86347(A) 3/1990 Japan .

*Primary Examiner*—Benedict V. Safourek
*Attorney, Agent, or Firm*—Staas & Halsey

[57] ABSTRACT

A route switching system in a communications network constituted of a transmitter and a receiver connected by a plurality of routes for switching a first route along which communication is being held by transmission of cells to a second route causing no blocking. The route switching system comprises a first switch provided in the transmitter for switching input cells from one route to another and outputting the cells, a first storage portion provided in the transmitter for storing the input cells, a second switch provided in the receiver for switching input cells from one route to another and outputting the cells, and a second storage portion provided in the receiver for storing the input cells. At the time when the route is switched over, the first switch is changed over so that the cells are transmitted through the first storage portion and, on the receiver side, the second switch is changed over so that the cells transmitted over the second route are stored into the second storage portion. The transmitter includes a switching signal generating portion for outputting, at the time of route switching, a switching timing signal to the receiver side through the first switch, and the receiver includes a switching signal detecting portion for detecting the switching timing signal from the switching signal generating portion. When cells are stored into the first and second storage portions while the route is switched over, the cells are stored first into the second storage portion on the receiver side.

21 Claims, 11 Drawing Sheets

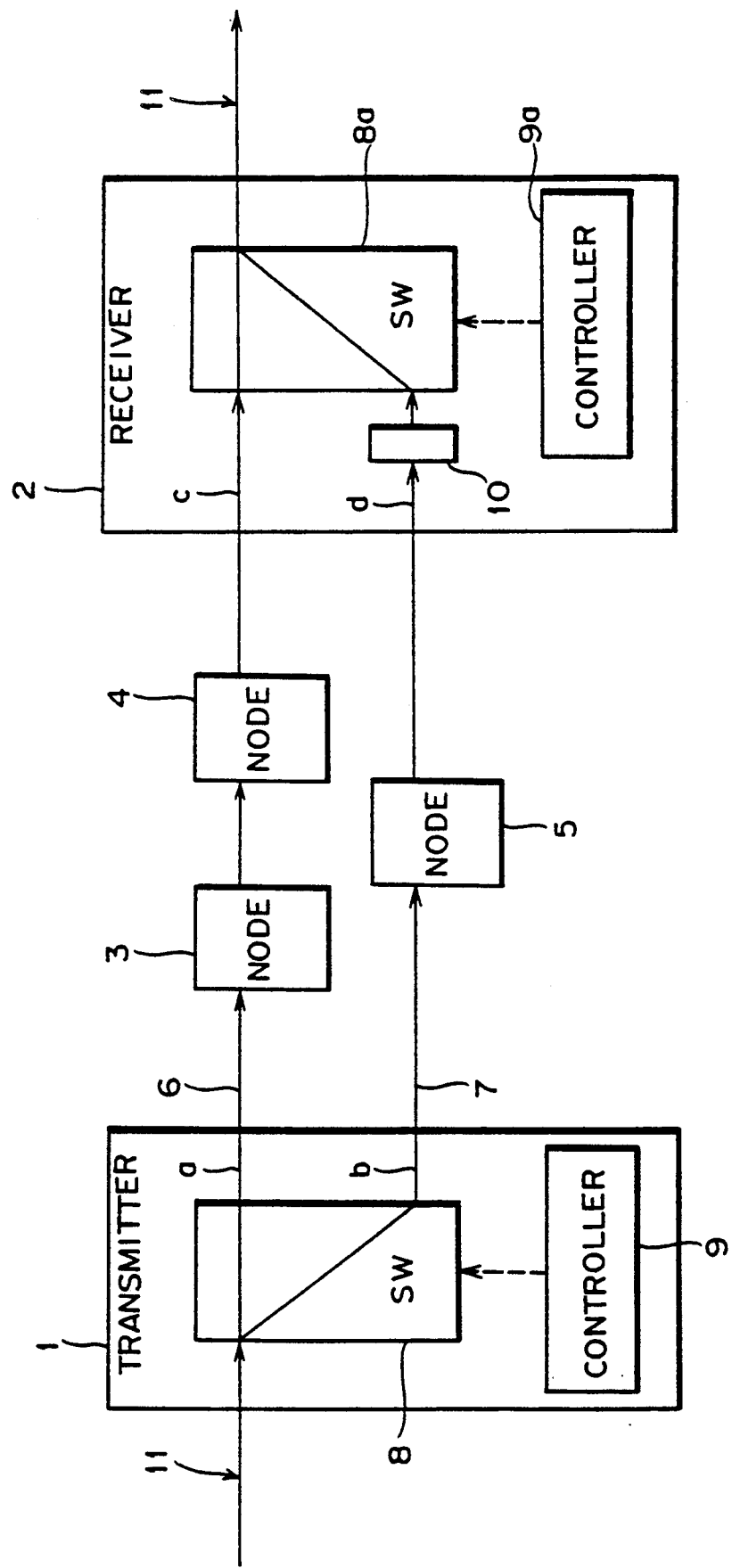

ROUTE SWITCHING SYSTEM IN COMMUNICATIONS NETWORK

BACKGROUND OF THE INVENTION

The present invention relates to a route switching system in a communications network.

In recent years, ATM (Asynchronous Transfer Mode) transmission system has been extensively studied and developed as a hopeful basic technology for the wide area ISDN (Integrated Services Digital Network). The ATM transmission system is a technology dividing information into blocks called cells, each thereof having a fixed length of 53 bytes (5 bytes for header and 48 bytes for information field), to achieve high-speed multiplexed information transmission and exchanging. Transmission speed 2.4 'Gb/s is attained by this system.

The communications network based on such ATM transmission system is expected to have applicability to the subscribers system (urban network) in the wide band ISDN in future. When such communications network is structured, survivability of the network comes to have a deep significance. This is because a network failure produces a great injurious effect on the information-oriented society. As to the technology of structuring a network having the ATM transmission system as its base, great efforts are being made for standardization by international standards committees including CCITT. There are demands for a route switching system free from blocking taking advantage of the ATM transmission system in the communications network.

A conventional route switching system will be described below with reference to FIG. 1, FIG. 2A and FIG. 2B.

FIG. 1 shows an example of structure of a communications network, which is formed of a transmitter 1 and a receiver 2 connected by a first transmission line 6 and a second transmission line 7 with a plurality of repeating nodes 3, 4, and 5 of the same function inserted therein. The transmitter 1 comprises a switching portion 8 and a controlling portion 9. The switching portion 8 is arranged in a cross connect structure of an N×N full availability trunk group having a plurality of signal lines, N longitudinal lines and N lateral lines, and performs route switching of input cells 11 under the control of the controlling portion 9 to output the cells 11 to the arbitrarily selected transmission line 6 or 7.

The receiver 2 comprises a switching portion 8a and a controlling portion 9a and, in addition, a buffer 10 connected to the second transmission line 7. The buffer 10 is provided for absorbing a difference in delay caused at the time of route switching between the two routes. For example, while a communication is being held along the first transmission line 6, if the first transmission line 6 is switched to the second transmission line 7 (from the illustrated path "a" to the path "b" and from the path "c" to the path "d") due to a trouble of the first transmission line 6, such as line breakage or increase in traffic, without causing blocking, then, the cells 11 which have been transmitted from the side "a" of the output side of the transmitter 1 come to be output from the side "b" as shown in FIG. 2A.

At this time of route switching, the cells 11 input to the side "c" and the side "d" on the input side of the receiver 2 overlap each other around the switched portion on account of a difference in delay between the first transmission line 6 and the second transmission line 7 as shown in FIG. 2B. More specifically, because the second transmission line 7 introduces a smaller amount of delay than that introduced by the first transmission line 6, the cell transmitted over the second transmission line 7 arrives at the receiver 2 earlier than the cell 11 transmitted over the first transmission line 6 to the receiver 2. When two train of cells are input overlapping each other, the information (cells) at the overlapping portion $t_d$ cannot be ensured.

Accordingly, it is arranged such that the cells at the overlapping portion $t_d$ are temporarily retained in the buffer 10 and, when the inputting of the cells 11 to the side "c" is completed, the cells in the buffer 10 are read out and input to the switching portion 8a, and thereafter, the cells 11 transmitted over in succession to the side "d" are successively output from the receiver 2 through the buffer 10 and switching portion 8a.

Through such arrangement, at the time of route switching without blocking, the overlapping of the cells 11 can be eliminated and proper transmission can be directed.

In the above described route switching system, the overlapping of the cells 11 is absorbed by the buffer 10. However, in order that the cells at the overlapping portion $t_d$ are retained, a buffer of a large capacity is required. Hence, such a problem arises that the communications apparatus including such buffer 10 becomes larger in size and higher in cost.

Further, since the cells 11 transmitted after the route switching has been made are passed through the buffer 10, a delay time therefor is introduced and, hence, a problem arises that the transmission speed of the whole system becomes lower.

SUMMARY OF THE INVENTION

Accordingly, an object of the present invention is to provide a route switching system for use in a communications network capable of reducing the storage region in each device by having the entire storage region for retaining the cells at the time of route switching distributed to the transmitter and the receiver.

Another object of the present invention is to provide a route switching system for use in a communications network achieving reduction in size and cost of the communications devices.

A further object of the present invention is to provide a route switching system for use in a communications network capable of improving the transmission speed at the time of route switching.

In accordance with an aspect of the present invention, there is provided a route switching system in a communications network constituted of a transmitter and a receiver connected by a plurality of routes for switching a first route along which communication is being held by transmission of cells to a second route causing no blocking comprising: first switch means of a cross connect structure provided in the transmitter for switching input cells from one route to another and outputting the cells; first storage means provided in the transmitter for storing the input cells; means provided in the transmitter for changing over the first switch means at the time of route switching so that the cells are transmitted over the second route through the first storage means; switching signal generation means provided in the transmitter for outputting a switching timing signal at the time of route switching to the side of the receiver through the first switch means, the switching signal generation means being adapted to transmit a rear cell at the time of route switching as a constituent of the switching timing signal to the receiver over the first route; second switch means of a cross connect structure provided in the receiver for switching input cells from one route to another and outputting the cells; second storage means provided in the receiver for storing the input cells; means provided in the receiver for changing over the second switch means so that the cells transmitted over the second route may be stored into the second storage means; switching signal detection means provided in the receiver for detecting the switching timing signal output from the switching signal generation means; and means provided in the receiver allowing the cells stored in the second storage means to be output, when the switching signal detection means detects the rear cell, in succession to the rear cell.

Preferably, when cells are stored in second storage means in the receiver, a front cell, which indicates that it is the first cell transmitted along the second route selected by route switching, is transmitted from the switching signal generation means to the receiver along the second route. Upon detection of the front cell by the switching signal detection means of the receiver, the cells transmitted over the second route are stored into the second storage means in succession.

When the second storage means provided in the receiver is emptied of the cells while the second storage means is outputting the cells stored therein, the second storage means is released and the cells transmitted over the second route come to be output through the second switch means directly, not by way of the second storage means, and a release message is transmitted from the receiver to the transmitter. In the transmitter after receipt of the release message, the first storage means is released when the cells stored in the first storage means are completely output. Since the first and second storage means are provided for the transmitter and receiver, respectively, it is made possible to distribute the storage capacity to these devices and, hence, to make the transmitter and receiver smaller in size. When route switching is performed in the conventional arrangement, cells are passed through the storage means even after the route switching operation has been completed. In the present invention, however, the cells transmitted along the second route are arranged not to pass through the first and second storage means after the switching operation has been completed. Accordingly, the transmission speed of the cells can be increased.

In the arrangement with repeaters interposed between the transmitter and receiver, the repeater is provided with third storage means for storing cells while the route is switched over. Since the storage capacity of cells can be distributed to the transmitter, receiver, and repeater, the devices can be made still smaller in size.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 1 is a schematic diagram showing a communications network including a conventional route switching system;

DESCRIPTION OF THE PREFERRED EMBODIMENTS

Embodiments of the present invention will now be described below with reference to the accompanying drawings.

Figure 2A:
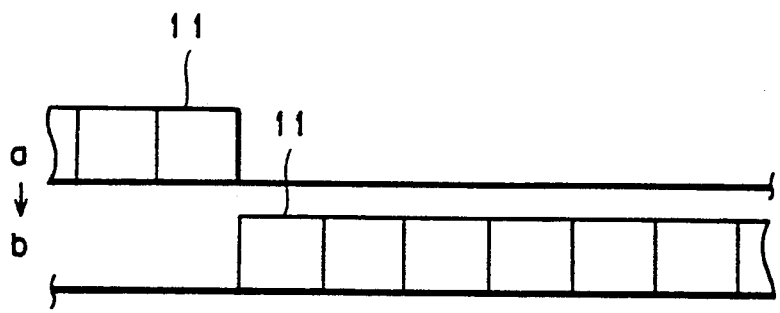
FIG. 2A is an explanatory diagram of the manner in which cells are output from a transmitter at the time of route switching.
Figure 2B:
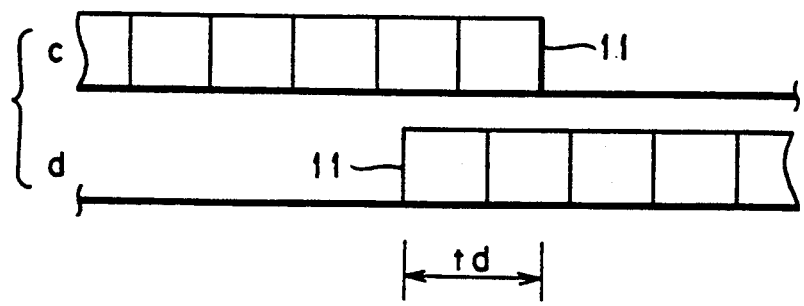
FIG. 2B is an explanatory diagram of the manner in which cells are input to a receiver at the time of route switching.
Figure 3:
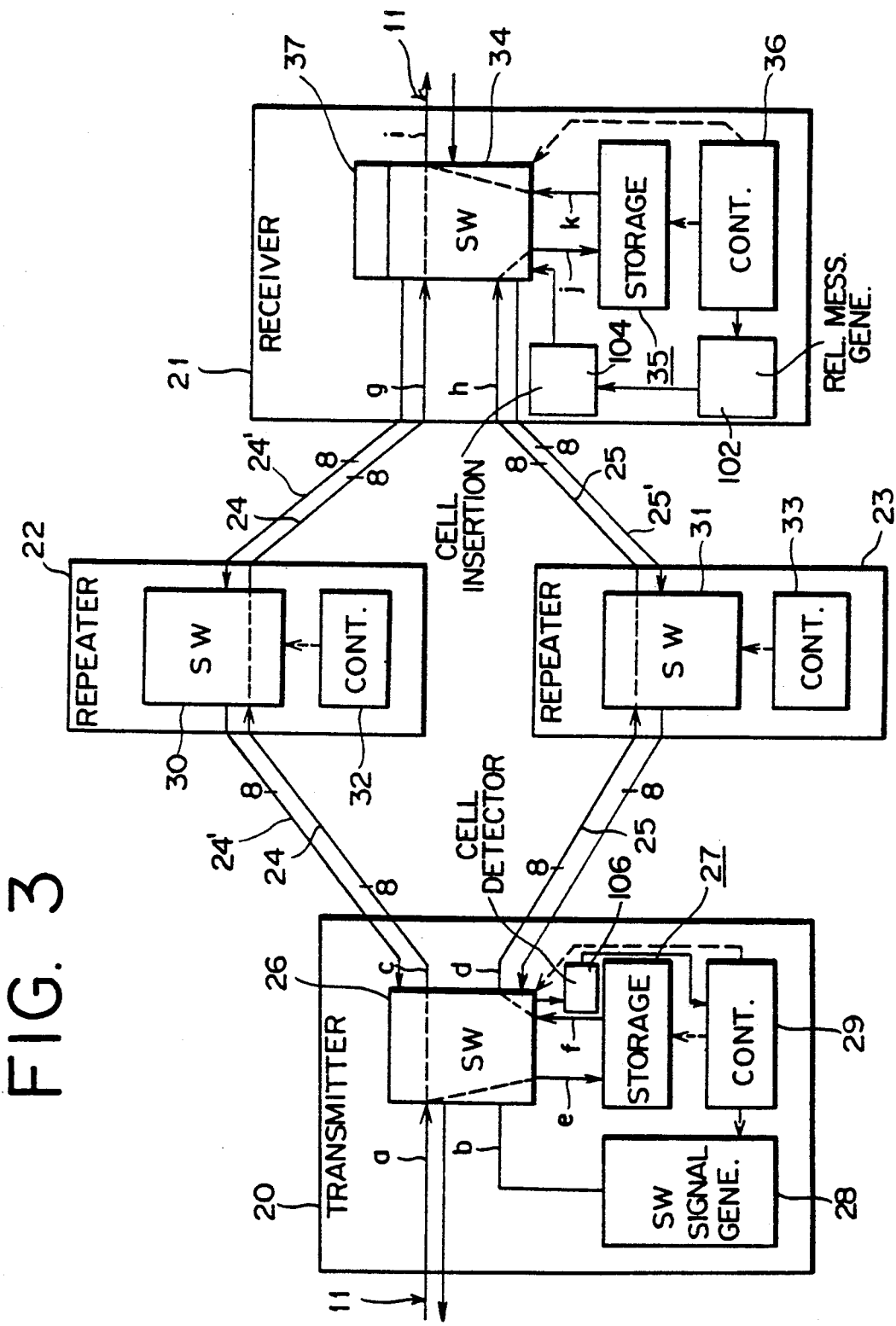
FIG. 3 is a block diagram of a route switching system according to a first embodiment of the invention.

FIG. 3 is a block diagram of a communications network for explaining a route switching system according to a first embodiment of the present invention.

The communication network shown in FIG. 3 is formed of a transmitter 20 and a receiver 21 connected by a first transmission line 24 and a second transmission line 25 with repeaters 22 and 23 of the same function inserted therein.

The transmitter 20 comprises a switching portion 26 similar to the conventional switching portion 8, 8a shown in FIG. 1, a storage portion 27 formed of a RAM, a buffer, or the like, a switching signal generating portion 28 for generating a timing signal for route switching, and a controlling portion 29 for controlling the switching portion 26, storage portion 27, and switching signal generating portion 28. The repeaters 22 and 23 are formed of switching portions 30 and 31 of the same function as that of the switching portion 26 and controlling portions 32 and 33 for controlling the cells passing through the switching portions 30 and 31, respectively. The receiver 21 comprises a switching portion 34, a storage portion 35, and a controlling portion 36 similar to those provided in the transmitter 20, and a switching signal detecting portion 37 for detecting the switching signal.

Operations of the described arrangement in the case where route switching is made without causing instantaneous stopping and blocking will now be described.

The case where the route on the side of the first transmission line 24, for example, along which communication is being held, that is, the cells 11 input to the transmitter 20 through the path "a" are being output from the receiver 21 thorough the switching portion 26—path "c"—repeater 22—path "g"—switching portion 34—path "i", is switched to the route on the side of the second transmission line 25 will be described.

At this time, first, a path f-d is established in the transmitter 20 under the control of the controlling portion 29 and a path h-j is established in the receiver 21 under the control of the controlling portion 36. Thereby, a route along which the cells 11 are transmitted from the transmitter 20 to the receiver 21 through the repeaters 23 is established.

Then, the path a-c is switched to a path a-e in the transmitter 20 under the control of the controlling portion 29, and a rear cell is transmitted from the switching signal generating portion 28 to the path "c" through the switching portion 26, and, at the same time, a front cell is delivered from the switching signal generating portion 28 to the path "d". The switching of the path a-c to the path a-e is an arrangement whereby the cells 11 input to the transmitter 20 are transmitted over the second transmission line 25 through the storage portion 27, the transmission of the rear cell is an arrangement whereby the receiver 21 is informed of the fact that route switching was performed in the transmitter 20 and no more cells subsequent to the rear cell will come over the route along which the rear cell was transmitted, and the transmission of the front cell is an arrangement whereby the start of the cells transmitted after the route switching has been made is recognized. The front cell is stored in the storage portion 35 of the receiver 21.

When the switching signal detecting portion 37 of the receiver 21 detects the rear cell, the path g-i is switched to a path k-i. Thereby, the cells transmitted over the new route after the route switching was performed and successively stored in the storage portion 35 until the switching signal detecting portion 37 detects the rear cell are output along the path k-i. That is, after the rear cell has been detected, the front cell is first output from the storage portion 35 along the path k-i and then the cells stored in the storage portion 35 are output in the order of their being stored.

When the storage portion 35 of the receiver 21 is emptied, it opens the paths h-j and k-i and switch them to a path h-i and delivers a release message informing that this switching has been performed to the transmitter 20. The transmitter 20, when its storage portion 27 is emptied of the cells similarly to the receiver 21 after receiving the release message, releases the paths a-e and f-d and switch them to a path a-d. Thereby, the cells 11 input to the transmitter 20 are transmitted not passing through the storage portions 27 and 35.

According to the first embodiment described above, since the storage portions 27 and 35 are provided for the transmitter 20 and the receiver 21, respectively, the cells transmitted along the new route when the route is switched over can be distributed to the storage portions 27 and 35 to be stored therein until the cells transmitted along the old route before the route switching are completely transmitted. That is, the storage capacity of each of the storage portions 27 and 35 can be reduced to half the storage capacity of the storage portion 10 in the conventional example shown in FIG. 1. Hence, the size of the storage portion 27, 35 becomes less than half that of the conventional one. Accordingly, the receiver can be made smaller in size than the conventional one.

Further, while the overall transmission speed in the conventional example was low because the cells transmitted along the new route were passed through the storage portion 10, it has been arranged in the first embodiment such that the route is switched to the route not passing through the storage portion 27 or 35 when the storage portion 27 or 35 is emptied of the cells.

Hence, the transmission speed can be made higher than in the conventional example.

Figure 4:
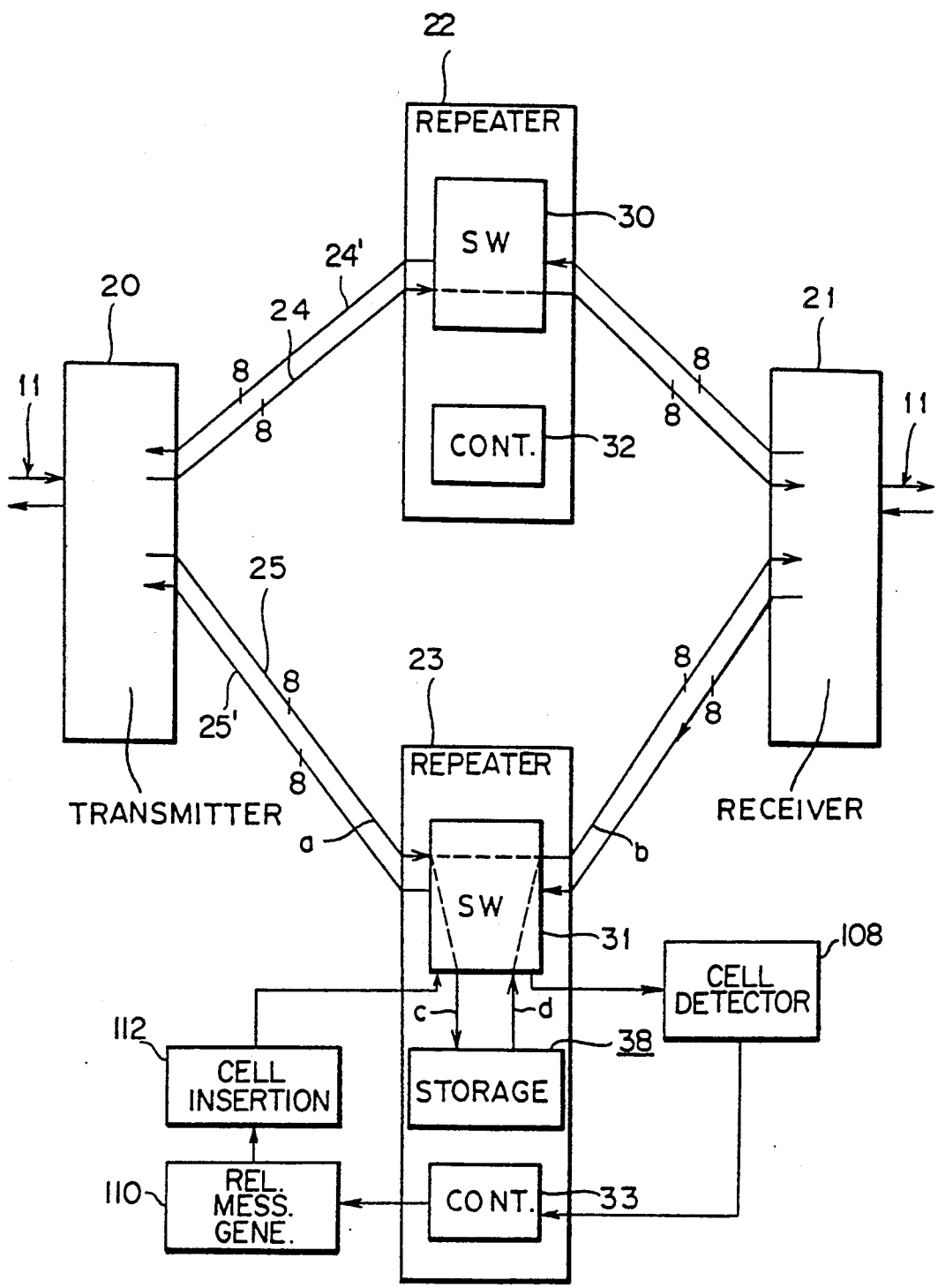
FIG. 4 is a block diagram of a route switching system according to a second embodiment of the invention.

Now, a second embodiment of the present invention will be described with reference to FIG. 4. Parts in FIG. 4 corresponding to those shown in the first embodiment of FIG. 3 are denoted by the same reference numerals and hence explanation of the same will be omitted. In FIG. 4, other sections than those characteristic of the second embodiment are not shown.

The point in which the second embodiment is different from the first embodiment is that a storage portion 38 is provided for each of the repeaters 22 and 23 (FIG. 4 shows only the storage portion 38 for the repeater 23) so that the cells, when transmitted along the second transmission line 25 after route switching, pass through the storage portion 38.

Since the overall storage capacity can be distributed to the above described storage portion 38 and the storage portion 27 for the transmitter 20 and the storage portion 35 for the receiver 21, which are described with reference to FIG. 3, the size of each storage portion 27, 35, 38 can be made still smaller than in the first embodiment, and thereby the transmitter and receiver can be made still smaller in size.

When the route is switched over in the arrangement of FIG. 4, the path a-c, the storage portion 38, and the path d-b are connected to provide the route within the repeater 23 so that the cells are transmitted along this route, but when the storage portion 38 is emptied of the cells after a release message from the receiver 21 has arrived at the repeater 23, the route within the repeater 23 is switched to the path a-b. Thereupon, the repeater 23 transmits a release message to the transmitter 20.

By such arrangement, even if the storage portion 38 is provided for the repeater 23, the storage portion 38 can be isolated by the release message. Accordingly, the same as in the first embodiment, the transmission speed of the cells can be made higher than in the conventional arrangement.

A third embodiment of the present invention will now be described with reference to FIG. 5. Parts in FIG. 5 corresponding to those shown in the second embodiment of FIG. 4 are denoted by the same reference numerals and hence explanation of the same will be omitted.

The point in which the third embodiment is different from the second embodiment is that a cell transmission interval controlling portion 39 is provided for each of the storage portions 27, 35, and 38 and thereby the output interval of the cells from each of the storage portions 27, 35, and 38 is made shorter than the input interval of them to the same so that the stored cells can be output quickly.

Figure 5:
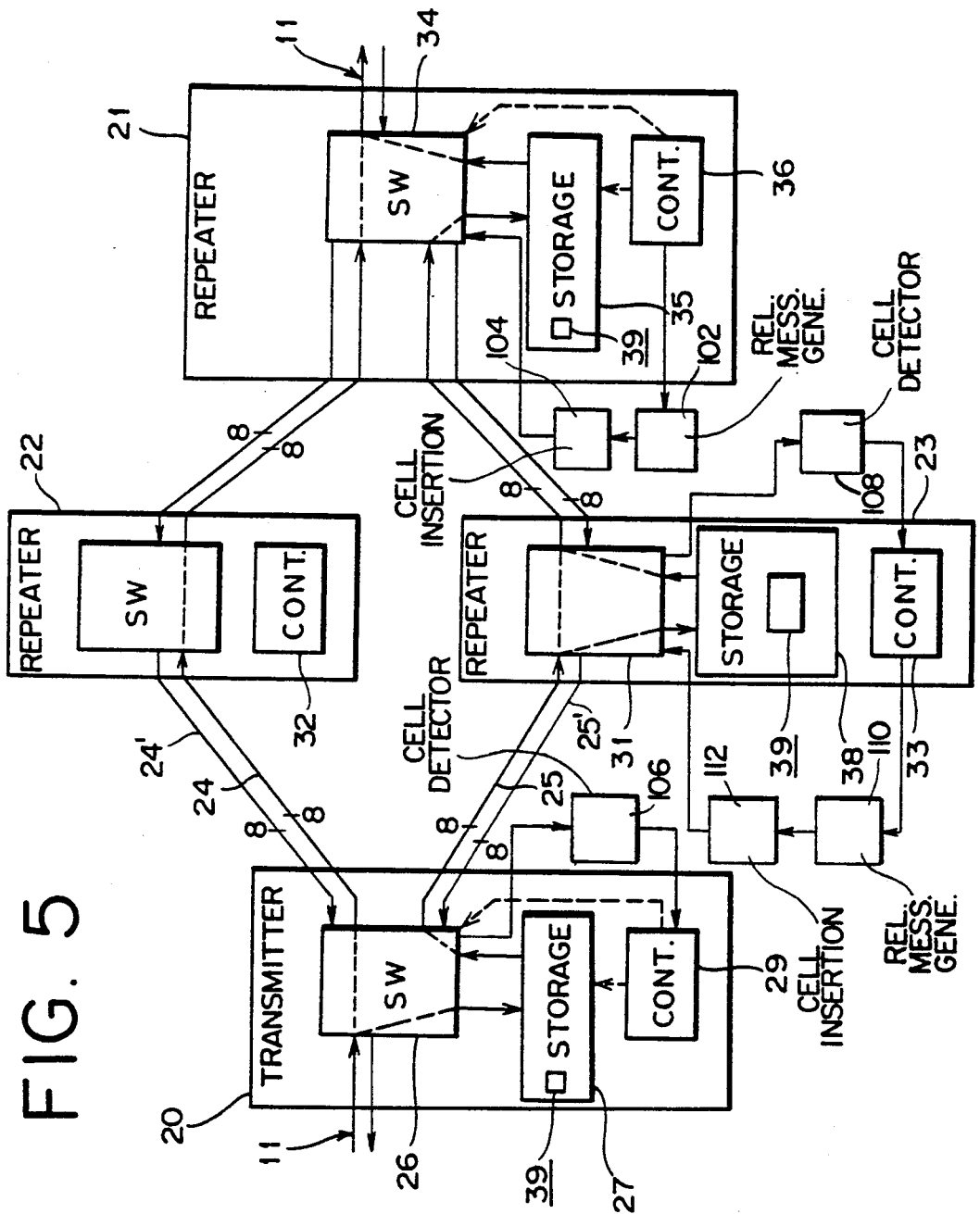
FIG. 5 is a block diagram of a route switching system according to a third embodiment of the invention.

That is, the cell transmission interval controlling portion 39 shown in FIG. 5 has a function to control so that the cell output capacity of each of the storage portions 27, 35, and 38 may become larger than the cell input capacity. For example, when the route is switched from the side of the first transmission line 24 to the side of the second transmission line 25, the cells are transmitted at the beginning along the route passing through the storage portions 27, 35, and 38. At this time, the cells can be quickly output from the storage portions by the control of the cell transmission interval controlling portion 39.

As a result, each of the storage portions 27, 35, and 38 can be emptied quickly, and hence, the isolation of them can be attained in a shorter time than that of the storage portions 27, 35, and 38 in the second embodiment.

Figure 6:
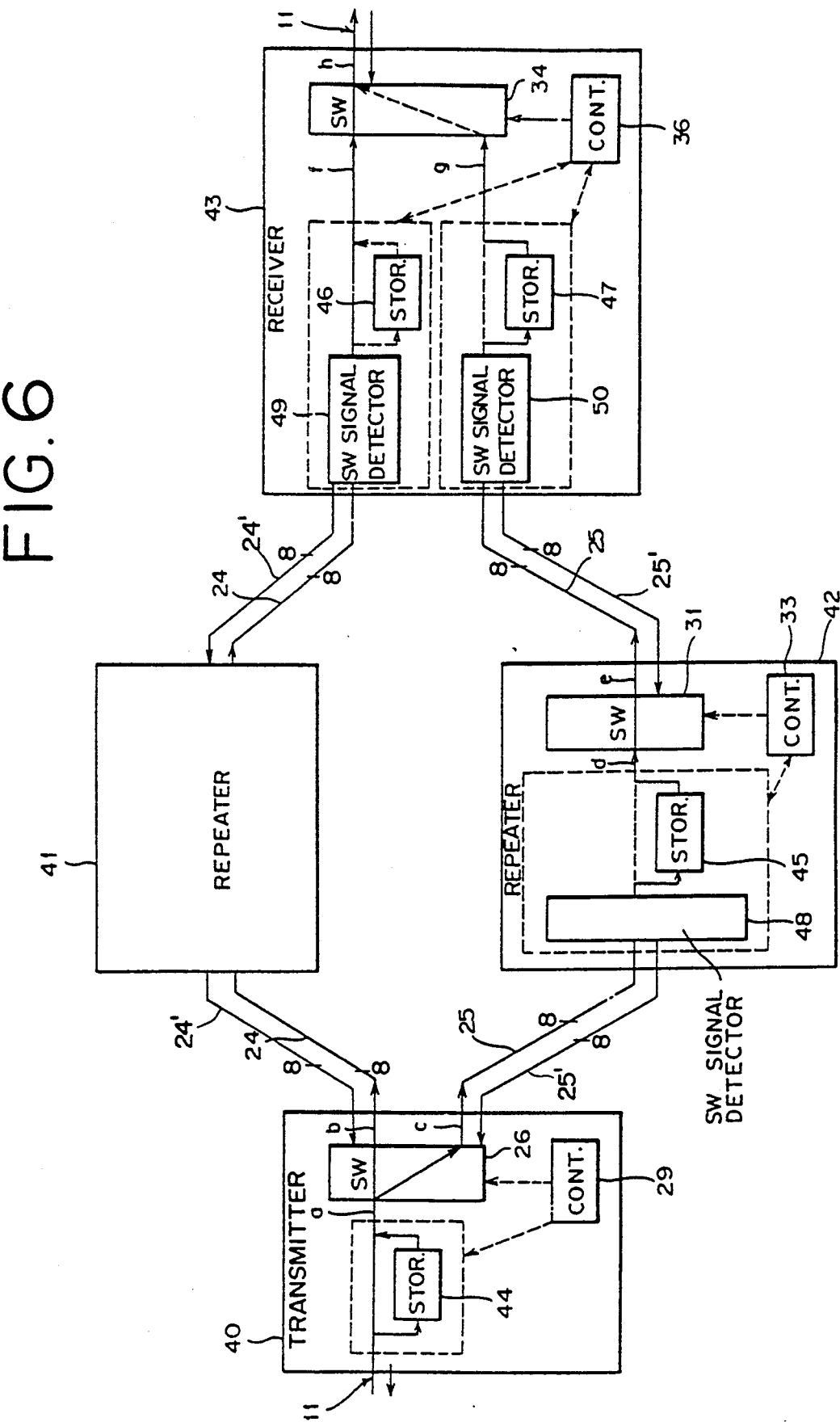
FIG. 6 is a block diagram of a route switching system according to a fourth embodiment of the invention.

A fourth embodiment of the present invention will now be described with reference to FIG. 6.

In the fourth embodiment, the manner of connections in the transmitter 40, the repeaters 41 and 42, and the receiver 43 is similar to that in the first to third embodiments. What is characteristic of this fourth embodiment is that storage portions 44, 45, 46, and 47 are connected to the input lines connected with the input terminals of the switching portions 26, 31, and 34 of the transmitter 40, repeaters 41 and 42, and receiver 43.

The transmitter 40 includes the switching portion 26, controlling portion 29, and storage portion 44, of which the storage portion 44 is connected to the path "a" (input line) connected with the input terminal of the switching portion 26.

The repeater 42 (the repeater 41 being of the same structure as the repeater 42, illustration and explanation of its internal structure are omitted) includes the switching portion 31, controlling portion 33, storage portion 45, and switching signal detecting portion 48, of which the switching signal detecting portion 48 is connected with the second transmission line 25 on the input side of the repeater 42 and the storage portion 45 is connected to the path "d", which connects the output terminal of the switching signal detecting portion 48 and the input terminal of the switching portion 31.

The receiver 43 includes the switching portion 34, controlling portion 36, storage portions 46 and 47, and switching signal detecting portions 49 and 50, of which the switching signal detecting portion 49 is connected with the first transmission line 24 on the input side of the receiver 43, the switching signal detecting portion 50 is connected with the second transmission line 25, the storage portion 46 is connected to the path "f", which connects the output terminal of the switching signal detecting portion 49 and the input terminal of the switching portion 34, and the storage portion 47 is connected to the path "g", which connects the output terminal of the switching signal detecting portion 50 and the input terminal of the switching portion 34.

With the described arrangement, in the transmitter 40, when, for example, the route is switched from the side of the first transmission line 24 to the side of the second transmission line 25, the cells 11 input to the transmitter 40 are controlled by the controlling portion 29 so as to be input to the switching portion 26 through the storage portion 44. In the repeater 42, when the front cell transmitted first from the transmitter 40 is detected by the switching signal detecting portion 48, the cells are controlled by the controlling portion 33 so as to be input to the switching portion 31 through the storage portion 45. In the receiver 43, when the front cell is detected by the switching signal detecting portion 50, the cells from the switching signal detecting portion 50 are controlled by the controlling portion 36 to be stored into the storage portion 47. At this time the switching portion 34 of the receiver 43 is outputting the remaining cells, which are being transmitted over the route of the first transmission line 24, to the path f-h.

When the switching signal detecting portion 49 of the receiver 43 detects the rear cell, the path f-h is switched to the path g-h. Thereby, the cells stored in the storage portion 47 are output along the path g-h.

In the devices 40, 42, and 43, the transmission of the cells through the storage portions 44, 45, and 47 is carried on, but when each of the storage portions 44, 45, and 47 is emptied of the cells, each of the controlling portions 29, 33, and 36 detects it and changes over the route to that not passing through the storage portions 44, 45, and 47. Thereafter, the transmission of the cells along the route not passing through the storage portions 44, 45, and 47 is carried on in the devices 40, 42, and 43.

According to the fourth embodiment described above, since the overall storage capacity can be distributed to the storage portions 44, 45, and 47, the size of each of the storage portions 44, 45, and 47 can be made smaller and, hence, the transmitter and receiver can be made smaller in size. Further, since the route is switched to that not passing through the storage portions 44, 45, and 47 when the storage portions 44, 45, and 47 are emptied of the cells stored therein, the transmission speed can be made higher than in the conventional arrangement.

Figure 7:
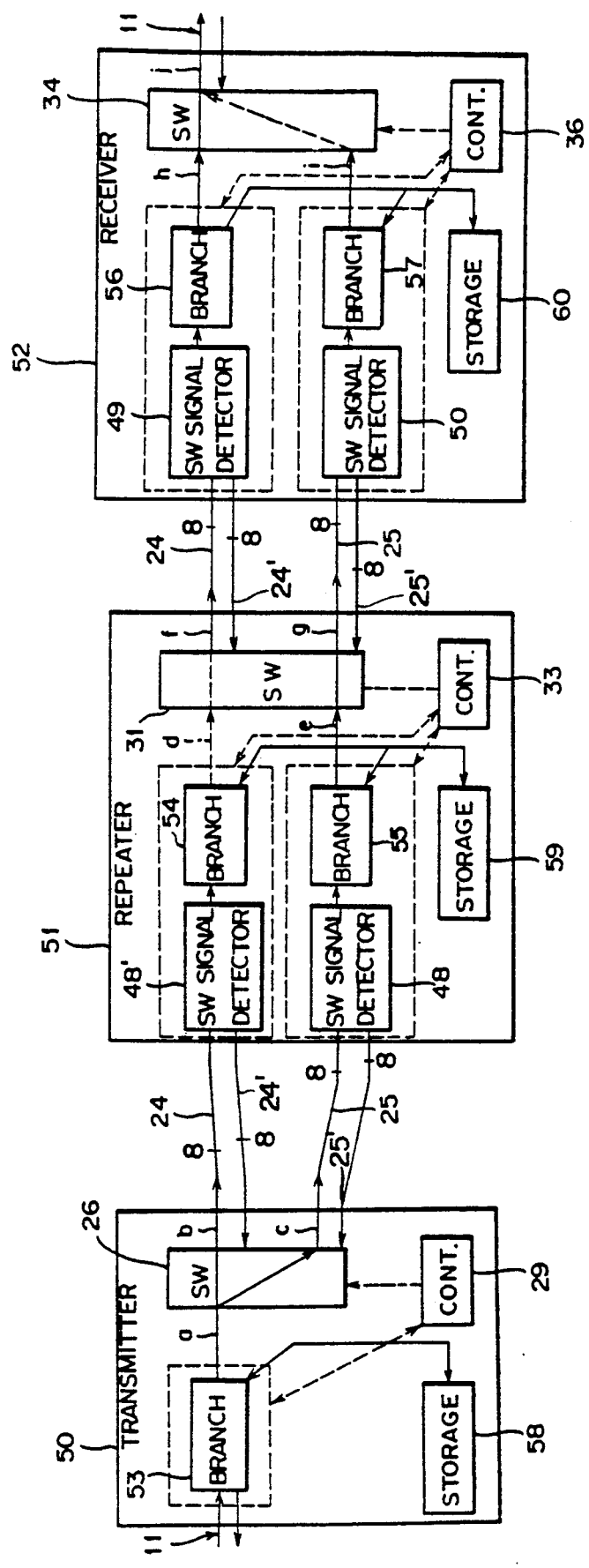
FIG. 7 is a block diagram of a route switching system according to a fifth embodiment of the invention.

A fifth embodiment of the present invention will now be described with reference to FIG. 7.

In the fifth embodiment, the transmitter 50 and the receiver 52 are connected by the first transmission line 24 and the second transmission line 25 with a single repeater 51 inserted therein. What is characteristic of this fifth embodiment is that the transmitter 50, repeater 51, and receiver 52 are provided with branch portions 53, 54, 55, 56, and 57 so that input cells may be output through the branch thereof to the storage portion and, then, the cells from the storage portion may be output to the switching portion.

The transmitter 50 includes the switching portion 26, controlling portion 29, branch portion 53, and storage portion 58, of which the branch portion 53 is connected between the input side of the transmitter 50 and the input terminal of the switching portion 26 and the storage portion 58 is connected with the branch portion 53.

The repeater 51 includes the switching portion 31, controlling portion 33, switching signal detecting portions 48 and 48', branch portions 54 and 55, and storage portion 59, of which the switching signal detecting portion 48' is inserted in the first transmission line 24 on the input side of the repeater 51 and the branch portion 54 is connected between the output terminal of the switching signal detecting portion 48' and the input terminal of the switching portion 31, while the switching signal detecting portion 48 is inserted in the second transmission line 25 and the branch portion 55 is connected between the output terminal of the switching signal detecting portion 48 and the input terminal of the switching portion 31. Further, the storage portion 59 is connected with the branch portions 54 and 55.

The receiver 52 includes the switching portion 34, controlling portion 36, switching signal detecting portions 49 and 50, branch portions 56 and 57, and storage portion 60, of which the switching signal detecting portion 49 is inserted in the first transmission line 24 on the input side of the receiver 52 and the branch portion 56 is connected between the output terminal of the switching signal detecting portion 49 and the input terminal of the switching portion 34, while the switching signal detecting portion 50 is inserted in the second transmission line 25 and the branch portion 57 is connected between the output terminal of the switching signal detecting portion 50 and the input terminal of the switching portion 34. Further, the storage portion 60 is connected with the branch portions 56 and 57.

With the described arrangement, when the route is switched, for example, from the route on the side of the first transmission line 24 to the route on the side of the second transmission line 25, the controlling portion 29 in the transmitter 50 controls so that the cells 11 are turned off at the branch portion 53 to be stored into the storage portion 58. When the switching signal detecting portion 48 in the repeater 51 detects the front cell transmitted first from the transmitter 50, the controlling portion 33 controls so that the cells are turned off at the branch portion 55 to be stored into the storage portion 59. When the switching signal detecting portion 50 in the receiver 52 detects the front cell, the controlling portion 36 controls so that the cells are turned off at the branch portion 57 to be stored into the storage portion 60.

The storage of the cells into the storage portions 58, 59, and 60 is performed in such a manner that the front cell is first stored into the storage portion 60 and the cells following that are successively stored into this storage portion 60, and when its storage region becomes full of cells, the following cells are stored into the storage portion 59 and, further, when the storage region of the storage portion 59 becomes full of cells, the following cells are stored into the storage portion 58. While the cells are being thus stored into the storage portions 58 to 60, the switching portion 34 of the receiver 52 is outputting the remaining cells to be transmitted along the route on the side of the first transmission line 24 through the path h-j.

When the rear cell is detected by the switching signal detecting portion 49 of the receiver 52, the path h-j is switched to the path i-j under the control of the controlling portion 36 so that cells in the storage portion 60 are output through the branch portion 57 and the path i-j. When the storage portion 60 is emptied of the cells, the cells in the storage portion 59 are output through the branch portion 55, and then the cells in the storage portion 58 are output through the branch portion 53. When each of the storage portions 58, 59, and 60 is emptied of the cells, each is isolated from the path transmitting cells under the control of each of the controlling portions 29, 33, and 36.

According to the above described fifth embodiment, since the overall storage capacity can be distributed to the storage portions 58 to 60, the size of the each storage portion 58 to 60 can be made smaller and, hence, the transmitter and receiver can be made smaller in size.

Figure 8:
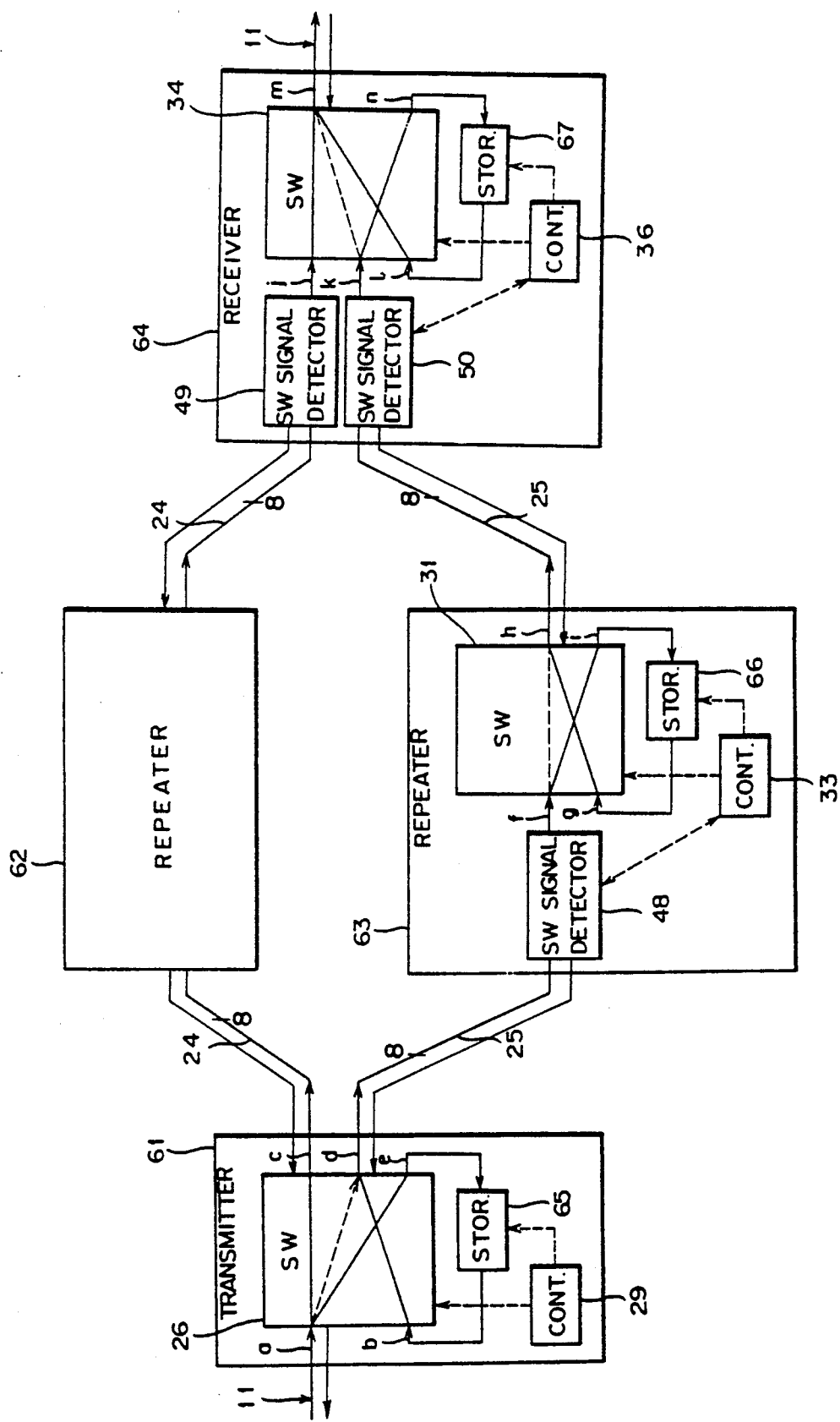
FIG. 8 is a block diagram of a route switching system according to a sixth embodiment of the invention.

Now, a sixth embodiment of the present invention will be described with reference to FIG. 8.

In this sixth embodiment, the transmitter 61 and the receiver 64 are connected by the first transmission line 24 with a repeater 62 inserted therein and also connected by the second transmission line 25 with a repeater 63 inserted therein. What is characteristic of this embodiment is that storage portions 65, 66, and 67 are connected to switching portions 26, 31, and 34 of the transmitter 61, the repeaters 62 and 63, and the receiver 64 and the cells are adapted to pass through the storage portions 65, 66, and 67 according to route establishment made by the switching portions 26, 31, and 34.

The transmitter 61 includes the switching portion 26, controlling portion 29, and storage portion 65, of which the storage portion 65 is connected with the switching portion 26. The storage portion 65 is connected with the switching portion 26 such that the input terminal of the storage portion 65 is connected with the output terminal of the switching portion 26 and the output terminal of the storage portion 65 is connected with the input terminal of the switching portion 26.

The repeater 63 (the repeater 62 being of the same structure as the repeater 63, illustration and explanation of its internal structure are omitted) includes the switching portion 31, controlling portion 33, switching signal detecting portion 48, and storage portion 66, of which the storage portion 66 has its input terminal connected with the output terminal of the switching portion 31 and has its output terminal connected with the input terminal of the switching portion 31.

The receiver 64 includes the switching portion 34, controlling portion 36, switching signal detecting portions 49 and 50, and storage portion 67, of which the storage portion 67 has its input terminal connected with the output terminal of the switching portion 34 and has its output terminal connected with the input terminal of the switching portion 34.

With the described arrangement, when the route is switched, for example, from that on the side of the first transmission line 24 to that on the side of the second transmission line 25, the path f-h is established by the switching portion 31 of the repeater 63. Next, the paths a-e and b-d are established by the switching portion 26 of the transmitter 61 so that the cells 11 may pass through the storage portion 65, the paths f-i and g-h are established by the switching portion 31 of the repeater 63 so that the cells may pass through the storage portion 66, and the paths k-n and l-m are established by the switching portion 34 of the receiver 64 so that the cells may be stored into the storage portion 67.

Then, the switching portion 26 of the transmitter 61 switches the path a-c to the path a-e to start the transmission of the cells. The receiver 64, when its switching signal detecting portion 49 detects the rear cell, switches the path j-m to the path l-m and outputs the cells stored in the storage portion 67. When the storage portion 67 is emptied of the cells, the path l-m is switched to the path k-m and the establishment of the path k-n is canceled. Thereby, the cells incoming to the receiver 64 thereafter are output along the path not passing through the storage portion 67. Thereafter, when the storage portion 66 of the repeater 63 is emptied, the path g-h is switched to the path f-h and the establishment of the path f-i is canceled. Further, when the storage portion 65 is emptied, the path a-e is switched to the path a-d. By the above described operations, the cells transmitted along the route on the side of the second transmission line 25 are transmitted along the path not passing through the storage portions 65 to 67 of the devices 61, 63, and 64.

According to the above described sixth embodiment, since the overall storage capacity can be distributed to the storage portions 65 to 67, the size of storage portions 65 to 67 can be made smaller and, hence, the transmitter and receiver can be made smaller in size. Further, the route, when each of the storage portions 65 to 67 is emptied of the cells, is switched to that not passing through the storage portions 65 to 67, and therefore, the transmission rate can be made higher than in the conventional arrangement.

Figure 9:
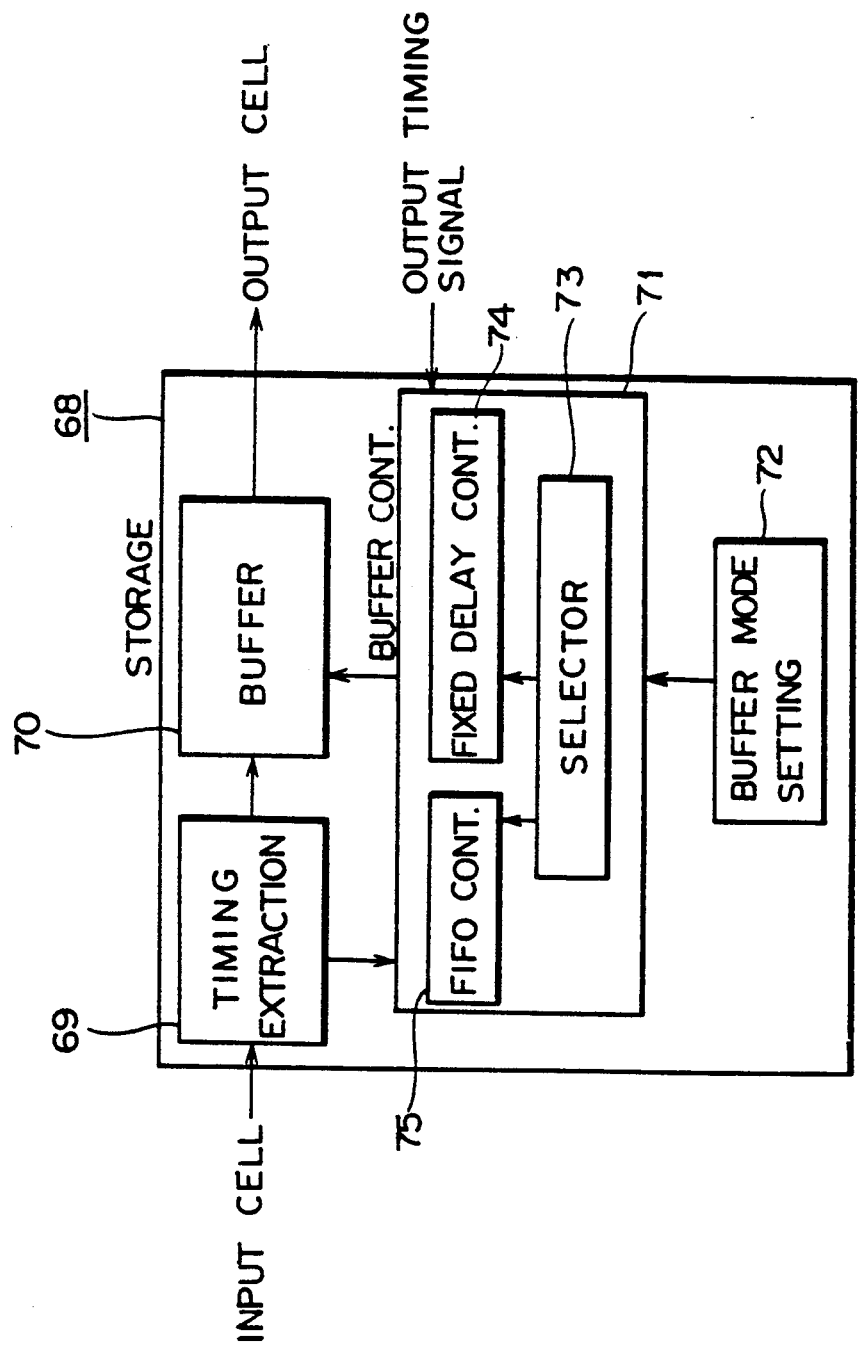
FIG. 9 is a block diagram showing an embodiment of a storage portion.

The storage portion in each of the first to sixth embodiments is structured, for example, as shown in FIG. 9.

The storage portion 68 shown in FIG. 9 comprises a timing extracting portion 69, a buffer portion 70, a buffer controlling portion 71, and a buffer mode setting portion 72. The buffer controlling portion 71 comprises a selector 73, a fixed delay controller 74, and a FIFO (First-In-First-Out) controller 75.

The timing extracting portion 69 is that detects the input timing of the cells input to the storage portion 68 and the buffer portion 70 is for storing the cells. The buffer controlling portion 71 is that controls the buffer portion 70 in accordance with the setting made by the buffer mode setting portion 72.

A first item of the control is such that outputs the cells, which are input to the buffer portion 70 through the timing extracting portion 69, at a desired transmission interval in the order of their being input. This is achieved by having an instruction given from the buffer mode setting portion 72 to the FIFO controller 75 through the selector 73 to cause the buffer portion 70 to control the inputting and outputting order and the interval of transmission of the cells and having an instruction then given from the FIFO controller 75 to the buffer portion 70 to control the inputting and outputting order and the interval of transmitting of the cells, which instruction is based on the timing measured by the FIFO controlling portion 75 upon receipt by the buffer controlling portion 71 of the input timing of the cells detected by the timing extracting portion 69 and also based on the output timing signal.

A second item of the control is that controls the delay of the cell in the buffer portion 70. This is achieved by having an instruction given from the buffer mode selecting portion 72 to the fixed delay controller 74 through the selector 73, to control the delay of the cell in the buffer portion 70 and fix it at a desired value, so that, the fixed delay controller 74, upon receipt of the instruction, establishes the delay in the buffer portion 70.

By using the storage portion 68 capable of executing such control in the storage portion of each of the first to sixth embodiments, the delivery interval and delay of the cells passing through the storage portion 68 can be controlled at will. Accordingly, when passing the cells through the storage portion at the time of route switching, it becomes possible to transmit the cells fast and to perform switching quickly.

Figure 10:
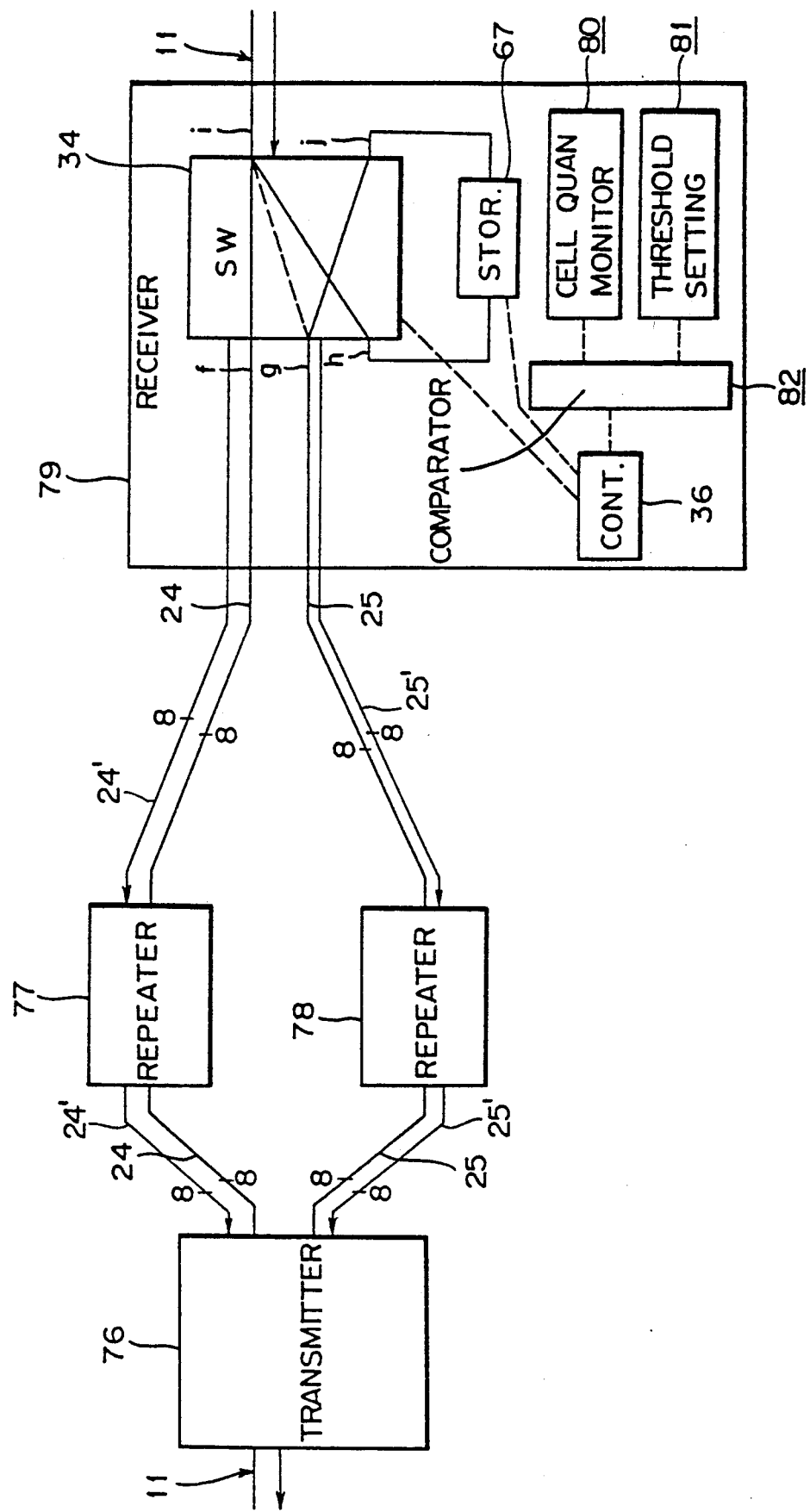
FIG. 10 is a block diagram of a route switching system according to a seventh embodiment of the invention.

Now, a seventh embodiment of the present invention will be described with reference to FIG. 10.

In this seventh embodiment, the transmitter 76 and the receiver 79 are connected by the first transmission line 24 with a repeater 77 inserted therein and also connected by the second transmission line 25 with a repeater 78 inserted therein. What is characteristic of this embodiment is that the receiver 79 includes a cell quantity monitoring portion 80 for monitoring the quantity of the cells in the storage portion 67, a threshold value setting portion 81 for setting the threshold value of the cell quantity to a desired value, a comparison portion 82 for comparing the cell quantity detected by the cell quantity monitoring portion 80 with the threshold value set by the threshold value setting portion 81.

In the receiver 79 structured as described above, when the route is switched, for example, from the route on the side of the first transmission line 24 to that on the side of the second transmission line 25, the path f-i and the path g-j are established in the receiver 79 by the switching portion 34. The cells transmitted along the switched second transmission line 25 are successively stored in the storage portion 67 through the path g-j. The cell quantity stored in the storage portion 67 is monitored by the cell quantity monitoring portion 80 at all times and the cell quantity is output to the comparison portion 82 to be compared with the set value (threshold value) in the threshold value setting portion 81. When it is detected that the rear cell transmitted along the first transmission line 24 has passed the path f-i, the path f-i is released and the path h-i is established. Thereafter, when the cell quantity in the storage portion 67 exceeds the threshold value, a signal indicating that the threshold value has been exceeded is output from the comparison portion 82 to the controlling portion 36, and the controlling portion 36 causes the storage portion 67 to output the cells.

By having such control executed, a merit is obtained that the cells in the storage portion 67 can be output when the quantity of them reaches a desired value, whereby the stored cells can be effectively output. The described structure of the receiver 79 can also be applied to the transmitter 76 and the repeaters 77 and 78.

Figure 11:
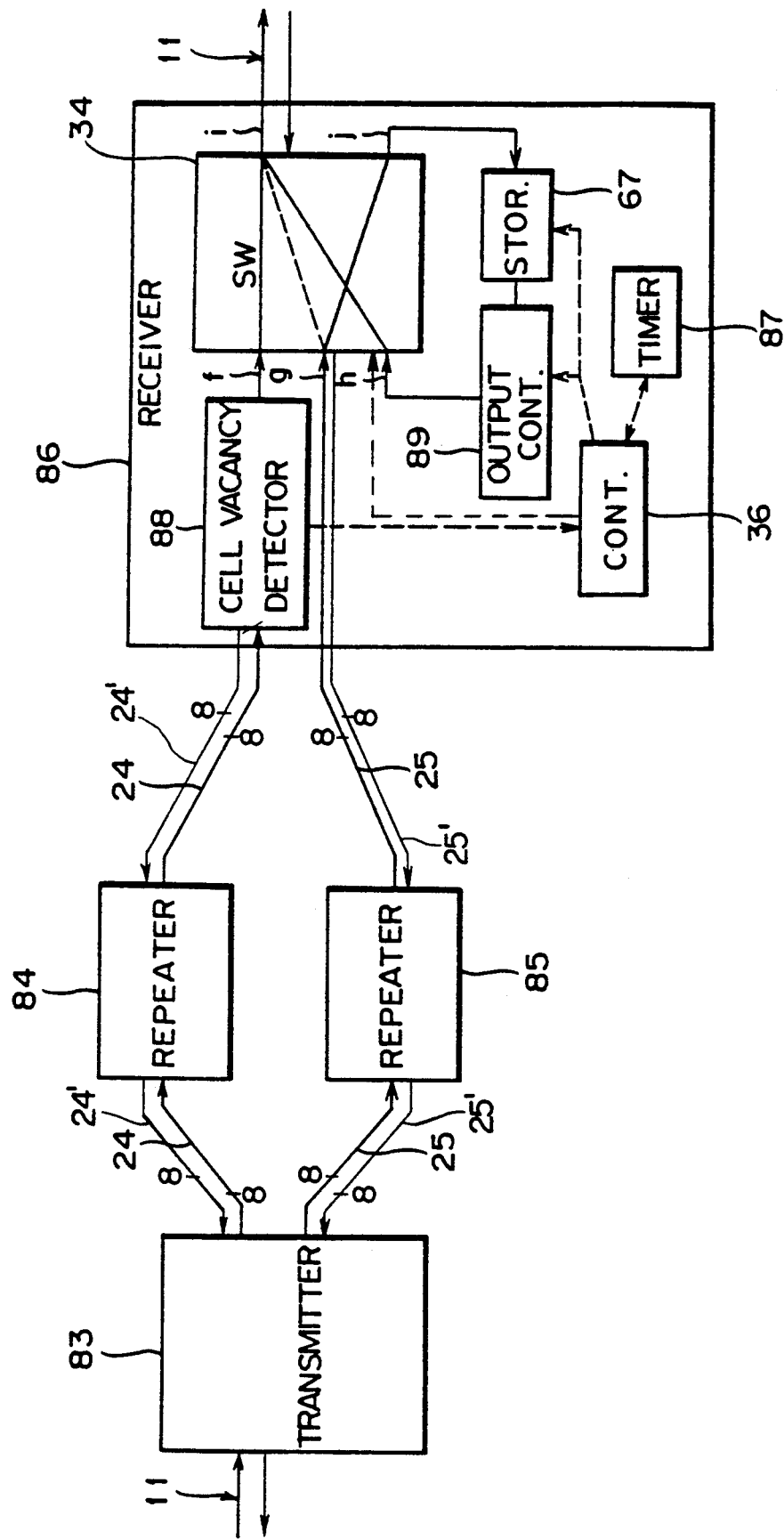
FIG. 11 is a block diagram of a route switching system according to an eighth embodiment of the invention.

Now, an eighth embodiment of the present invention will be described with reference to FIG. 11.

In this eighth embodiment, the transmitter 83 and the receiver 86 are connected by the first transmission line 24 with a repeater 84 inserted therein and also connected by the second transmission line 25 with a repeater 85 inserted therein. What is characteristic of this embodiment is that the receiver 86 includes a timer 87 for setting a desired time and a cell vacancy detecting portion 88 for outputting a cell vacancy signal to the controlling portion 36 when no cell comes in during the period of the time set in the timer 87.

In the receiver 86 structured as described above, supposing now that the route is switched, for example, from the route on the side of the first transmission line 24 to that on the side of the second transmission line 25, the cell vacancy detecting portion 88, when the state in which no cell comes in along the first transmission line 24 continues over the time set in the timer 87, detects it and outputs the cell vacancy signal to the controlling portion 36. Thereupon, the controlling portion 36 controls the storage portion 67 and an output controlling portion 89 so that cells in the storage portion 67 are output.

By having such control executed, it can be detected that the remaining cells transmitted along the first transmission line 24 have been completely output from the receiver 86 even if no rear cell is delivered from the transmitter as practiced in the previous embodiments, and upon this detection, the cells stored in the storage portion 67 can be output.

According to the present invention as described in the foregoing, a meritorious effect is obtained that the communications devices can be made smaller in size, and in addition, with the reduction in size, the cost of the devices can be reduced.

Further, when the route is switched over with no blocking produced in a network, the route switching can be performed quickly, and the need for passing the cells through storage means, such as a buffer, after the route switching has been completed, as practiced in the conventional arrangement, can be eliminated and therefore, a meritorious effect is obtained that the overall transmission speed can be increased.

What is claimed is:

1. A route switching system in a communications network including a transmitter and a receiver connected by a plurality of routes for switching a first route along which communication is being held by transmission of cells to a second route comprising:

first switch means of a cross connect structure provided in said transmitter for switching input cells from one route to another and outputting the cells;

first storage means provided in said transmitter for storing said input cells;

means provided in said transmitter for changing over said first switch means at the time of route switching so that the cells are transmitted over said second route through said first storage means;

switching signal generation means provided in said transmitter for outputting a switching timing signal at the time of route switching to the side of said receiver through said first switch means, said switching signal generation means being adapted to transmit a rear cell at the time of route switching as a constituent of said switching timing signal to said receiver over said first route;

second switch mean of a cross connect structure provided in said receiver for switching input cells from one route to another and outputting the cells;

second storage means provided in said receiver for storing said input cells;

means provided in said receiver for changing over said second switch means so that the cells transmitted over said second route may be stored in said second storage means;

switching signal detection means provided in said receiver for detecting the switching timing signal output from said switching signal generation means; and means provided in said receiver allowing the cells stored in said second storage means to be output, when said switching signal detection means detects said rear cell, the cells stored in said second storage means being output subsequent to said rear cell.

2. A route switching system according to claim 1, further comprising a plurality of repeaters, each repeater including third switch means of a cross connect structure for switching input cells from one channel to another and outputting the cells, and control means for executing operation control of said third switch means.

3. A route switching system according to claim 1, wherein said switching signal generation means is adapted, at the time of route switching, to transmit a front cell as a constituent of said switching timing signal to said receiver over said second route, and wherein when said switchinq siqnal detection means detects said front cell, the cells transmitted over said second route are stored into said second storage means.

4. A route switching system according to claim 1, further comprising:

means for releasing said second storage means when the second storage means is emptied of the cells while the cells are output from said second storage means, so that the cells transmitted over said second route are output through said second switch means directly;

means for transmitting a release message from said receiver to said transmitter;

means provided in said transmitter for detecting said release message; and means for releasing said first storage means when the cells stored in said first storage means have been output completely after said release message has been detected, so that the input cells are output through said first switch means directly.

5. A route switching system according to claim 1, further comprising:

first cell transmission interval control means provided in said transmitter capable of setting the transmission interval of the cells output from said first storage means at a desired value; and second cell transmission interval control means provided in said receiver capable of setting the transmission interval of the cells output from said second storage means at a desired value.

6. A route switching system according to claim 1, wherein the output side of said first switch means is connected with the input side of said first storage means and the output side of said first storage means is connected with the input side of said first switch means, while the output side of said second switch means is connected with the input side of said second storage means and the output side of said second storage means is connected with the input side of said second switch means.

7. A route switching system according to claim 1, wherein each of said first and second storage means comprises:

timing extraction means for detecting input timing of the input cells;

buffer means for temporarily storing the cells output from said timing extracting means and outputting the cells;

input/output control means for controlling order of inputting/outputting and output interval of the cells in said buffer means according to the input timing signal of the cells extracted by said timing extraction means;

delay control means for controlling the delay of the cell in said buffer means; and means for setting the output interval of the cells controlled by said input/output control means and the delay of the cell controlled by said fixed delay control means at desired values.

8. A route switching system according to claim 1, wherein each of said first and second storage means includes cell quantity monitor means for detecting the cell quantity therein.

9. A route switching system according to claim 2, further comprising:

third storage means provided in said each of said plurality of repeaters; and means for changing over said third switch means at the time of route switching so that he cells are transmitted over said second route through said third storage means.

10. A route switching system according to claim 9, further comprising:

means for releasing said second storage means from operation by bypassing said second storage means when the second storage means is emptied of the cells while the cells are output from said second storage means, so that the cells transmitted over said second route are output through said second switch means directly;

means for transmitting a release message to each of said plurality of repeaters inserted in said second route;

means provided in said repeater for detecting said release message;

means for releasing said third storage means from operation by bypassing said third storage means when said third storage means is emptied of the cells stored therein after said release message has been detected, so that the cells transmitted over said second route are output through said third switch means directly; and means for transmitting a release message to said transmitter.

11. A route switching system according to claim 9, further comprising:
   first cell transmission interval control means provided in said transmitter capable of setting the transmission interval of the cells output from said first storage means at a desired value,
   second cell transmission interval control means provided in said receiver capable of setting the transmission interval of the cells output from said second storage means at a desired value; and
   third cell transmission interval control means provided in each of said plurality of repeaters capable of setting the transmission interval of the cells output from said third storage means at a desired value.

12. A route switching system according to claim 9, further comprising:
   means for controlling, when cells are stored in said first, second, and third storage means at the time of route switching, such that the cells are stored into said second storage means, said third storage means, and said first storage means in this order; and
   means for controlling, when cells stored in said first, second, and third storage means are output, such that the cells are output from said second storage means, said third storage means, and said first storage means in this order.

13. A route switching system according to claim 10, further comprising:
   means provided in said transmitter for detecting the release message from each of said plurality of repeaters;
   means for releasing said first storage means from operation by bypassing said first storage means when said first storage means is emptied of the cells stored therein after said release message has been detected, so that the cells input thereto may be output through said first switch means directly.

14. A route switching system according to claim 5, wherein each of said first and second cell transmission interval control means controls the output interval of the cells from said first and second storage means to be shorter than the input interval of the cells to said first, second and third storage means.

15. A route switching system according to claim 11, wherein each of said first, second, and third cell transmission interval control means controls the output interval of the cells from said first, second, and third storage means to be shorter than the input interval of the cells to said first, second and third storage means.

16. A route switching system in a communications network including a transmitter and a receiver connected by a plurality of routes for switching a first route along which communication is being held by transmission of cells to a second route comprising:
   first switch means of a cross connect structure provided in said transmitter for switching input cells from one route to another and outputting the cells;
   first storage means connected with a first input line, which inputs cells to said first switch means, for storing said input cells;
   means for controlling said first branch means such that the cells input to said transmitter while communication is held along said first route are supplied to said first switch means through said first input line and for controlling said first branch means such that the cells input to said transmitter along said second route when the communication route is switched to said second route are supplied to said first switch means through said first storage means;
   second switch means of a cross connect structure provided in said receiver for switching input cells from one route to another and outputting the cells; and
   second storage means connected with a second input line, which inputs cells to said second switch means, for storing said input cells, said means for controlling supplying the cells input to said receiver while communication is held along said first route to said second switch means through said second input line and supplying the cells input to said receiver along said second route when the communication route is switched to said second route to said second switch means through said second storage means.

17. A route switching system according to claim 16, further comprising a plurality of repeaters, each repeater including third switch means of a cross connect structure for switching input cells from one route to another and outputting the cells, third storage means connected to a third input line, which inputs cells to said third switch means, for storing the cells, said means for controlling the cells input to said repeater while communication is held along said first route so that they are supplied to said third switch means through said third input line and supplying the cells input to said repeater when the communication route is switched to said second route to said third switching means through said third storage means.

18. A route switching system in a communications network including a transmitter and a receiver connected by a plurality of routes for switching a first route along which communication is being held by transmission of cells to a second route comprising:
   first switch means of a cross connect structure provided in said transmitter for switching input cells from one route to another and outputting the cells;
   first storage means provided in said transmitter for storing said input cells;
   first branch means provided in said transmitter for outputting said input cells to said first switch means or to said first storage means, said first branch means allowing the cells stored in said first storage means to be input to said first switch means through said first branch means;
   means for controlling said first branch means such that the cells input to said transmitter while communication is held along said first route are supplied to said first switch means, for controlling said first branch means such that the cells input to said transmitter when the communication route is switched to said second route are output to said first storage means, and such that the cells stored in said first storage means are read and output to said first switch means;
   second switch means of a cross connect structure provided in said receiver for switching input cells from one route to another and outputting the cells;
   second storage means provided in said receiver for storing said input cells; and
   second branch means provided in said receiver for outputting the cells input to said receiver to said second switch means or to said second storage means and further outputting the cells stored in said second storage means to said second switch means, for controlling said second branch means supplying the cells input to said receiver while communication is held along said first route to said second switch means, for controlling said second branch means such that the cells input to said receiver when the communication route is switched to said second route are output to said second storage means, and reading the cells stored in said second storage means into said second switch means.

19. A route switching system according to claim 18, further comprising a plurality of repeaters, each repeater including third switch means of a cross connect structure for switching input cells from one route to another and outputting the cells, third storage means for storing said input cells, and third branch means for outputting the cells input to said repeater to said third switch means or to said third storage means and further outputting the cells stored in said third storaqe means to said third switch means.

20. A route switching system in a communications network including a transmitter and a receiver connected by a plurality of routes for switching a first route along which communication is being held by transmission of cells to a second route comprising:

first switch means for a cross connect structure provided in said transmitter for switching input cells from one route to another and outputting the cells;

first storage means provided in said transmitter with its input side connected to the output side of said first switch means and its output side connected to the input side of said first switch means for storing said input cells;

first cell quantity monitor means for detecting the cell quantity stored in said first storage means;

first threshold value setting means for setting a threshold value of a cell quantity stored in said first storage means;

first comparison means for comparing the cell quantity detected by said first cell quantity monitor means with the threshold value set up by said first threshold value setting means;

means provided in said transmitter for changing over said first switch means at the time of route switchinq so that the cells are transmitted over said second route through said first storage means;

switching signal generation means provided in said transmitter for outputting a switching timing signal at the time of route switching to the side of said receiver through said first switch means;

means provided in said transmitter for receiving the comparisons from said first and second comparison means and providing control such that the cells stored in said storage means are output when the cell quantity stored in said first storage means exceeds the threshold value set up by said first threshold value setting means;

second switch means of a cross connect structure provided in said receiver for switching input cells from one route to another and outputting the cells;

second storage means provided in said receiver with its input side connected to the output side of said second switch means and its output side connected to the input side of said second switch means for storing said input cells;

second cell quantity monitor means for detecting the cell quantity stored in said second storage means;

second threshold value setting means for setting a threshold value of the cell quantity stored in said second storage means;

second comparison means for comparing the cell quantity detected by said second cell quantity monitor means with the threshold value set up by said second threshold value setting means;

means provided in said receiver for changing over said second switch means so that the cells transmitted over said second route are stored into said second storage means;

switching signal detection means provided in said receiver for detecting the switching timing signal output from said switching signal generation means; and means provided in said receiver for receiving the comparision from said first and second comparison means and providing control such that the cells stored in said second storage means are output when the cell quantity stored in said second storage means exceeds the threshold value set up by said second threshold value setting means.

21. A route switching system in a communications network including a transmitter and a receiver connected by a plurality of routes for switching a first route along which communication is being held by transmission of cells to a second route comprising:

cell vacancy detection means provided in said receiver for detecting existence or nonexistence of an input cell;

switch means of a cross connect structure provided in said receiver for switching input cells from one route to another and outputting the cells;

storage means provided in said receiver having an input side connected to the output side of said switch means and having an output side connected to the input side of said switch means for storing said input cells;

a timer provided in said receiver capable of setting a desired length of time;

means provided in said receiver for changing over said switch means so that the cells transmitted over said second route may be stored in said storage means; and means for controlling the cells stored in said storage means to be output when the time, during which no cell is transmitted along said first route, detected by said cell vacancy detection means exceeds the time set up in said timer while the transmission route is switched from said first route to said second route.

* * * * *